US012798897B2

(12) United States Patent
McEllin et al.

(10) Patent No.: US 12,798,897 B2
(45) Date of Patent: Nov. 17, 2026

(54) SORTING SYSTEM

(71) Applicant: FlexLink AB, Gothenburg (SE)

(72) Inventors: Paul McEllin, Northampton (GB); Sean Douglas, Peona, AZ (US)

(73) Assignee: FlexLink AB, Gothenburg (SE)

( * ) Notice: Subject to any disclaimer, the term of this patent is extended or adjusted under 35 U.S.C. 154(b) by 336 days.

(21) Appl. No.: 18/603,809

(22) Filed: Mar. 13, 2024

(65) Prior Publication Data

US 2024/0327117 A1 Oct. 3, 2024

Related U.S. Application Data

(60) Provisional application No. 63/493,147, filed on Mar. 30, 2023.

(51) Int. Cl.
*B65G 47/68* (2006.01)
*B65G 1/04* (2006.01)
(Continued)

(52) U.S. Cl.
CPC ........... *B65G 47/68* (2013.01); *B65G 1/0485* (2013.01); *B65G 1/1371* (2013.01);
(Continued)

(58) Field of Classification Search
CPC .... B65G 47/68; B65G 1/0485; B65G 1/1371; B65G 47/681; B65G 47/71; B65G 54/02;
(Continued)

(56) References Cited

U.S. PATENT DOCUMENTS

2015/0239015 A1* 8/2015 Asari ..................... B65G 47/68
209/606
2017/0050332 A1* 2/2017 Bauer ...................... B26D 7/30
2017/0158435 A1* 6/2017 Wiesmann ................ B07C 5/36

FOREIGN PATENT DOCUMENTS

DE 102014106400 A1 11/2015
DE 102016122462 A1 5/2018
(Continued)

OTHER PUBLICATIONS

International Search Report and Written Opinion for Patent Cooperation Treaty Application No. PCT/US2024/021944, dated Jul. 8, 2024, 13 pages.

*Primary Examiner* — Thomas Randazzo
(74) *Attorney, Agent, or Firm* — Alston & Bird LLP

(57) ABSTRACT

The disclosure relates to a sorting system comprising: a first, asynchronous, conveyor having an entry location for receiving first product carriers and an exit location for dispatching the first product carriers from the asynchronous conveyor; a second conveyor having a circulating path located at least in part next to the asynchronous conveyor and arranged for conveying second product carriers, an infeed region arranged for supplying second product carriers to the circulating path, and an outfeed region arranged to dispatch the second product carriers from the circulating path, and a control system. The control system is configured to control the asynchronous conveyor to: independently and individually control speed of a first product carrier to move the first product carrier to a position next to a matching second product carrier located on the second conveyor, and transfer a product carried by the first product carrier to the second product carrier at a variable deposit location on the second conveyor while the second product carrier is moving. The disclosure also relates to corresponding method for distributing products from a product source location to a target location. One advantage of the system and method is that a product can be transferred from a carrier to a container in an efficient manner.

18 Claims, 5 Drawing Sheets

(51) Int. Cl.
*B65G 1/137* (2006.01)
*B65G 47/71* (2006.01)
*B65G 54/02* (2006.01)

(52) U.S. Cl.
CPC ........... *B65G 47/681* (2013.01); *B65G 47/71* (2013.01); *B65G 54/02* (2013.01); *B65G 2203/0216* (2013.01)

(58) Field of Classification Search
CPC .......... B65G 2203/0216; B65G 47/646; B65G 47/962
See application file for complete search history.

(56) References Cited

FOREIGN PATENT DOCUMENTS

| | | | | | |
|---|---|---|---|---|---|
| DK | 4299201 | A1 | * | 1/2024 | ............. B65G 47/61 |
| EP | 3932838 | A1 | | 1/2022 | |
| NL | 4428070 | A1 | * | 9/2024 | ............... B07C 5/36 |

* cited by examiner

SORTING SYSTEM

CROSS-REFERENCE TO RELATED APPLICATIONS

The present application claims priority to and the benefit of U.S. Provisional Application Ser. No. 63/493,147, filed Mar. 30, 2023; the entire contents of which as are hereby incorporated by reference herein.

BACKGROUND

Related Field

The present disclosure relates to a sorting system adapted to feed products from a first product carrier to a second product carrier in a flexible manner, as well as a method for distributing products from a product source location to a target location in a flexible and reliable manner.

Related Art

Conveyor systems are e.g. used for moving objects between different work stations in a factory, and usually comprise a conveying track in the form of a belt or a chain. Conveyor belts may be used for straight conveyor systems, where the product is conveyed in a single direction, or when the product is diverted from one straight belt to another straight belt. In conveyor systems where the product is to pass through bends and curves, an endless chain conveyer is of advantage. The conveying tracks can be recessed in a trench with vertical side surfaces. Alternatively, they can be located on the horizontal upper surfaces of the trench or arranged in some other way. The objects to be conveyed are arranged slidably in relation to the conveying tracks, either directly or via carrying means, which are also known as carriers. A carrier may be provided with features to hold the product in a secure way, such that it does not fall, or shift in transport.

Other conveyor or transport systems are used to sort and distribute products from a central storage to individual receiving locations or positions into containers. Such systems are often used in warehouses, where products stored in the central storage are distributed to individual positions, where each position corresponds to an individual customer order or destination. Each position may thus comprise one or more different products picked from different locations in the central storage. When a container is complete or full, it is forwarded to a distribution centre, where the packages are delivered depending e.g. on postal code or other country specific regions.

For larger warehouses, such systems are very complicated and require a large space. The products are picked from the central storage by self-propelling robots, automated guided vehicles (AGV) or the like, and must then be forwarded to the different container positions in a controlled order.

In one system, the products are placed on a carrier comprising a product moving device such as a tiltable platform or a movable belt. The carrier moves along a long path where the receiving containers are placed in fixed positions, such that a product can be moved from the carrier to a container when the carrier passes the correct fixed container location. When a container is completed, it is moved to a distribution centre for further transportation, and an empty container is placed in the empty position.

In other systems, the products are placed on an endless belt that runs between containers. A product is diverted from the belt with a diverter when the product passes the correct container location. Other distribution systems are also known. Common for all these distribution systems is that the products are moved from a moving carrier of some type to a stationary container, which is located at a designated position that corresponds for example to a postal code or the like. These systems work well but are relatively inflexible and requires a large space.

There is thus room for an improved sorting system.

BRIEF SUMMARY

An object of the present disclosure is therefore to provide an improved sorting system. A further object of the disclosure is to provide an improved method for distributing products from a product source location to a target location.

The solution to the problem according to the disclosure is described in the independent appended claims. The other claims contain example embodiments and further developments of the sorting system and method.

According to a first aspect of the disclosure, the sorting system comprises a first, asynchronous, conveyor having an entry location for receiving first product carriers and an exit location for dispatching the first product carriers from the asynchronous conveyor; a second conveyor having a circulating path located at least in part next to the asynchronous conveyor and arranged for conveying second product carriers, an infeed region arranged for supplying second product carriers to the circulating path, and an outfeed region arranged to dispatch the second product carriers from the circulating path; and a control system configured to control the asynchronous conveyor to: independently and individually control speed of a first product carrier to move the first product carrier to a position next to a matching second product carrier located on the second conveyor, and transfer a product carried by the first product carrier to the second product carrier at a variable deposit location on the second conveyor while the second product carrier is moving.

The control system may be configured to determine the location of a matching second product carrier based on various parameters. Specifically, the control system may determine said matching location based on the type of product that is carried by the first product carrier, and/or the identity or location of a second product carrier that requests such a product. Since the request for a certain product by a second product carrier in some example is derived from incoming customer orders to the sorting system, wherein the incoming customer orders defines certain products that the customer wants delivered, the matching second product carrier ultimately can be said to be based on incoming customer orders.

In other words, in some example embodiments, the control system is configured to control the asynchronous conveyor to independently and individually control speed of a first product carrier to move the first product carrier to a position next to a matching second product carrier based on a received customer order, in particular based on the specific products that are requested in the customer order.

According to a further aspect of the disclosure, the method for distributing products from a product source location to a target location comprises: conveying the products on first product carriers from the product source location to an entry location of a first, asynchronous, conveyor; conveying second product carriers on a second conveyor having a circulating path located at least in part next to the asynchronous conveyor, wherein the second conveyor has an infeed region arranged for supplying the second product carriers to the circulating path and an outfeed region arranged to dispatch the second product carriers from the circulating path; independently controlling speed of a first product carrier to convey the first product carrier individually to a position next to a matching second product carrier located on the second conveyor; and transferring the product carried by the first product carrier to the second product carrier at a variable deposit location on the second conveyor while the second product carrier is moving.

According to a further aspect of the disclosure, the sorting system comprises a first product path and a second product path, where the first product path comprises a linear magnetic conveyor and a first endless chain conveyor, where the second product path comprises a second conveyor, where the sorting system comprises a plurality of carriers and a plurality of containers, where the first product path is arranged to convey the carriers, and where the second product path is arranged to convey the containers with a constant first speed, the object of the disclosure is achieved in that part of the linear magnetic conveyor is arranged adjacent and in parallel with the second conveyor, that a carrier is provided with magnetic means such that it can be conveyed by the linear magnetic conveyor, and that the linear magnetic conveyor is arranged to convey the carriers with a varying speed and to control the position of the carriers individually.

By these example embodiments of the sorting system according to the disclosure, a sorting system and associated method is provided that allows products to be transferred and distributed in a flexible and efficient manner is provided. In the sorting system, the products that are to be delivered are conveyed in a first product path, and the receiving containers are conveyed in a second product path. The products are conveyed with a variable speed, and the receiving containers are conveyed with a constant speed. The first product path and the second product path are arranged adjacent and in parallel with each other. A product is carried by a carrier having a transfer means of some type, such that the product can be transferred to a container. When a product is to be transferred, the carrier is conveyed to be aligned with the receiving container with the same speed, and the transfer means transfers the product to the receiving container.

The term carrier is hereinafter also referred to as first product carrier, and the term container is hereinafter also referred to as second product carrier.

Throughout the present disclosure, terms such as asynchronous conveyor and asynchronously conveying are intended to encompass conveying systems and methods where at least position and speed of the carriers are individually controllable, and the carriers are moveable independently of each other. One of the consequences of such systems and methods is that the speed of each carrier on the conveyor can be varied independently from other carriers, and that a distance between the carriers on the conveyor can be varied according to the circumstances.

A linear magnetic conveyor having individual control of the carriers is a typical example of an asynchronous conveyor. In fact, all type of conveyors that are configured to provide simultaneous individually controllable speed of a plurality of conveyed product carriers are asynchronous conveyors. For example, a conveyer configured for conveying product carriers, each of which has an individual propulsion system, such as an integrated propulsion motor, must be deemed being asynchronous conveyor. Similarly, a roller conveyer having individually controllable rollers may also be deemed being asynchronous conveyor due to its ability to provide simultaneous individual control of the speed of a plurality of conveyed spaced apart product carriers.

Throughout the present disclosure, terms such as synchronous conveyor and synchronously conveying are intended to encompass conveying systems and methods where all carriers are conveyed with the same speed, or at least with the same speed profile, such that all carriers remains at substantially same distance apart from each other when being conveyed along the conveyor.

An endless chain or belt conveyor is a typical example of a synchronous conveyor.

Due to the fact that products that are to be delivered are conveyed by the first product carriers with a variable speed, and the receiving second product carriers are conveyed with a constant speed, the transfer position, also referred to as the deposit location, may vary depending on the circumstances, A deposit location corresponds thus to the location of a second product carrier, which is moving along the second product path, at the time point when a product carried by a first product carrier is deposited or transferred to said second product carrier.

The variation in deposit location is sometimes referred to as dynamic deposit location or variable deposit location, because the actual transfer position will generally be different each consecutive time a product is transferred to a second product carrier. This variation in deposit location comes from the fact that the second product carriers are constantly moving along the second product path, and the time point of arrival of new first product carriers to the linear magnetic conveyor is not synchronised with the position of the second product carriers. In other words the solution of the present system and method according to the disclosure enables the filling of the second product carriers with the required amount of products while said second product carriers are moving.

Consequently, contrary to the prior art solution described in the Background, in which all containers are placed in fixed position until the container is full and replaced with an empty container, the new solution includes substantially constantly moving second product carriers, thereby enabling a more compact and cost-efficient sorting or conveyor system, partly because there is no need for conveyers that enables transport to and from individual fixed deposit positions, and partly because there are no stationary non-full second product carriers that block the path of other, fully loaded, second product carriers.

In other words, the sorting or conveyor system according to the present disclosure provides is a dynamic deposit location, which means that there are no fixed storage positions for the different second product carriers.

When a product has been transferred, the carrier returns to a pick-up station or product source location and is loaded with a new product. Since the carriers move with a variable speed, they can move fast to position themselves at a receiving container, and can move with the same speed as the receiving container when the product is transferred.

In the sorting system, several carriers move at the same time in the first product path. The first product path comprises a linear magnet conveyor that is arranged in parallel with the second product path. The first product path further comprises a conventional chain conveyor that will convey the carriers from the pick-up station to the magnetic conveyor.

The receiving containers are conveyed by the second conveyor with a constant first speed. This allows the control system of the sorting system to determine the exact position of each receiving container at all times.

In one example, the magnetic conveyor runs in a straight line with the second product path running in parallel. Carriers with products runs on the first product path and transfers each product to the correct container. When a container has received all products, the container can exit the second product path at an outfeed region. If the container has not received all products, the container can re-enter the second product path at the infeed region for another turn, until it has received all products. When a complete container leaves the second product path, an empty container may be introduced to the second product path, such that all positions of the second product path are occupied.

The second conveyor may or may not be provided with some sort of positioning means, such that the position of each container is fixed on the conveyor and that the container cannot slip or move, e.g. flights, arranged with a defined spacing. The second product path comprises an endless conveyor, preferably an endless chain conveyor or a belt conveyor. It may e.g. be a plastic chain conveyor having one or two plastic chains, or a twin track conveyor provided with two metal chains. The position or location of the container on the second conveyor may be determined logically with an encoder or identified with RFID. Since the position of each container can be determined, a carrier can easily target and follow a container during the transfer of a product.

The first product path may, as in the shown example, comprise a conventional plastic chain conveyor arranged to convey carriers. The first product path comprises a linear magnetic conveyor that will convey carriers using magnetic force. In some manner, the product is loaded onto the carrier prior to the linear magnetic conveyor. The chain conveyor may e.g. move a carrier from a loading position, where a product is picked up from a distribution station, to the magnetic conveyor where the carrier transfers the product to a container. The magnetic conveyor is arranged in parallel with at least part of the second product path. The magnetic conveyor is arranged to convey a carrier in an asynchronous movement, and the speed of each carrier can be controlled individually. This allows several carriers to transfer products at the same time to different containers. The carrier can be conveyed quickly to a required position, where it can then be synchronized with the same speed as a container, and when the product has been transferred, it can be accelerated to a higher speed and be conveyed quickly to the return path, where a conventional chain conveyor conveys it back to the distribution station.

In a regular transfer system, each receiving container is positioned in a fixed, specific and predefined position. The products are transferred to the container from a conveyor with carriers or self-propelling vehicles, such as AGVs. The control system knows in which position each container is positioned, and a completed container is picked up from this position and forwarded to a predefined deposit location.

When a container has received all the products, it exits the second product path and may be forwarded to a manifest location, i.e. a storage or target location, where the containers for example may be stored temporarily before they are shipped to customers, sent to a consumer or supplied to a subsequent manufacturing process.

The deposit location is a dynamic deposit location, which means that there are no fixed storage positions for the different containers. In a regular deposit location, there are fixed and defined locations for all the different possible destinations. A destination may be e.g. a postal code, a retail location, a customer, etc. In such a system, there must be a reserved position for each destination, regardless of how much or how often each position is used. At the same time, each position must be able to handle the maximal foreseeable amount of containers. The reserved space for each destination may of course differ in dependency of historical data, but there must be a reserved space for each destination. Some spaces may only be used rarely, or the size of the space is most of the times too large. Such a deposit location system will thus require a large space, where most of the space is unused.

According to some example embodiments of the system, each container is provided with an individual identification tag of some sort. Preferably, a wireless transmitter/receiver tag, e.g. an RFID tag, is used, but a bar code or the like is also possible to use. Since each container can be identified at all times, the position of each container can be monitored and followed at all times by the control system of the conveyor system. This is useful when the containers are fed to the second conveyor path, and when the containers leave the second conveyor path and are placed in the manifest location. The use of independently identifiable containers allows for a dynamic deposit location, such that fixed and predefined positions for the different destinations are not required. In this way, the deposit location can be made much smaller, which will save a lot of space.

According to some example embodiments, each carrier is provided with a transfer means arranged to transfer a product from the carrier to a container, The transfer means may for example be a tilt function, a belt function or a pusher of some type.

A further object of the disclosure is to provide an improved method for transferring a product from a first product carrier to a second product carrier, and to provide a conveyor system adapted for the transfer of a product from a first product carrier to a second product.

The solution to the problem according to the disclosure is described in the following part of the present disclosure.

The disclosure further relates to a method for transferring a product from a first product carrier to a second product carrier, where the first product carrier travels in a first direction, and where the second product carrier travels in the same direction, the steps of; moving the second product carrier with a constant first speed; moving the first product carrier with a speed that is higher than the first speed until the first product carrier is aligned with the second product carrier; moving the first product carrier with the same speed as the second product carrier; activating a transfer means of the first product carrier such that the product is transferred from the first product carrier to the second product carrier; moving the first product carrier away from the second product carrier with a speed that is higher than the first speed are disclosed.

By the method according to the disclosure, a product can be transferred from a first product carrier to a second product carrier in a flexible and efficient manner. The second product carrier moves with a constant and known speed, preferably by an endless conveyor of some sort. A suitable endless conveyor is an endless chain or belt conveyor, comprising one or two chains or belts. By using an endless plastic chain conveyor, the second product carrier can be conveyed through curves. By using endless belt conveyors or metal chain conveyors, the endless conveyor may comprise several conveyor tracks.

The second product carrier may be any type of a separate carrier that can be conveyed by an endless conveyor and that is adapted to receive products, such as a container, a box, a tote, a cardboard box, a crate or the like. The second product carrier is preferably provided with an identification means of some sort, e.g. an RFID tag, a bar code or another computer readable identification. The second product carrier could also be fixedly attached to the conveyor. In this case, the products would be transferred from the second product carrier to a separate product carrier at an end region of the conveyor system.

The first product carrier is moved with a varying speed, such that the first product carrier can be controlled individually when it comes to speed and position. In this way, the first product carrier can be controlled to a position next to the second product carrier, in which the first product carrier is aligned with the second product carrier, and in which position it can move with the same speed as the second product carrier. When the first product carrier and the second product carrier moves with the same speed next to each other, the product can be transferred from the first product carrier to the second product carrier in a reliable manner by activating a transfer means of the first product carrier. When the product has been transferred, the first product carrier can move away from the second product carrier with a higher speed. In this way, the first product carrier will not be in the way for other first product carriers, and will be able to collect a new product in a fast way.

In one example, the first product carrier is an automated guided vehicle (AGV) provided with wheels. This will allow the first product carrier to be controlled individually with respect to speed and position. The AGV can be loaded at a distribution station where a product is placed on the carrying surface of the AGV. The AGV can then be driven to a second product carrier travelling along a straight path with a constant speed. The AGV is driven up to the second product carrier destined for the product, where the AGV is driven next to the second product carrier with the same speed. When the AGV and the second product carrier are aligned with each other and move with the same speed, a transfer means of the AGV is activated, which transfers the product to the second product carrier in a secure way. When the product has been transferred, the AGV drives away from the second product carrier and returns to the distribution station with a high speed to collect a new product.

In another example, the first product carrier is a pallet conveyed by a magnetic conveyor. This allows the pallet to be controlled individually with respect to the speed of the pallet. The pallet can be loaded at a distribution station where a product is placed on the carrying surface of the pallet. The pallet can then be conveyed to a straight part of a magnetic conveyor arranged in parallel with the conveyor of the second product carriers, where a second product carrier travels along a straight path with a constant speed. The pallet and the second product carrier will here travel in the same direction. The pallet can be conveyed from the distribution station by an endless conveyor chain or by a part of the magnetic conveyor.

The pallet is conveyed with a high speed until the pallet reaches the second product carrier destined for the product, where the pallet is conveyed next to the second product carrier with the same speed. When the pallet and the second product carrier are aligned and move with the same speed, a transfer means of the pallet is activated, which transfers the product to the second product carrier in a secure way. When the product has been transferred, the pallet is conveyed away from the second product carrier and returns to the distribution station with a high speed to collect a new product.

Since the cost for magnetic conveyors is much higher than for conventional endless chain conveyors, and since magnetic conveyors are much more complicated, it is of advantage to use a magnetic conveyor only at the transfer region of the conveyor system. The infeed conveyor conveying pallets to the magnetic conveyor from the distribution station and the outfeed conveyor conveying pallets from the magnetic conveyor back to the distribution station may thus be conventional endless plastic chain conveyors or other types of conveyors. The pallet is a conventional pallet arranged to be conveyed by such an endless plastic chain conveyor, where the pallet is provided with magnetic means such that it can be controlled and conveyed by the magnetic conveyor as well. The pallet is provided with a rectangular bottom surface such that the pallet will be directed in the same position through the product path.

One advantage with the method according to the disclosure is that both the first product carrier that carries the product and the second product carrier that receives the product moves in the same direction during the transfer. In this way, products can be transferred from pallets to e.g. containers with a high rate, without putting excessive stress on the products, since the speed difference between the pallet and the container is zero. In a conventional transfer system, where the receiving containers are fixed and the products are conveyed on a conveyor, each product is e.g. pushed from the conveyor by a pusher arm or a diverter arm. With a high speed of the conveyor, the impact on the product will also be high, which may damage the product. The speed of the conveyor must thus be limited, which reduces the throughput of the system. With the method according to the disclosure, there is further no risk that the product missed the container during the transfer of the product.

Further, in a conventional transfer system, where each receiving container is assigned a specific position, a large area is required to accommodate all different containers. Further, each empty container must be delivered and each completed container must be removed by a further delivery system. With a moving train of receiving containers, a dynamic transfer system is provided, where only the required containers are present. A number of containers are conveyed by the second conveyor, where each container is conveyed at a specific position on the conveyor. The position for a container is determined when the container enters the conveyor, e.g. by detecting the container by an RFID or a bar code. With knowledge of the position of the container on the conveyor and the speed of the conveyor, the control system of the transfer system can determine the position of the container such that a pallet can transfer a product to a specific container. If e.g. five different products should be transferred to a specific container, the control system will determine five different transfer positions for five different pallets.

In one example, the containers enters the second conveyor at an infeed region and exits the second conveyor at an outfeed region. If a container is not completed, i.e. the container has not received all products that are to be delivered to that container, when it arrives at the outfeed region, it can be forwarded to the infeed region for another turn, until all product has been delivered. Preferably, all products are delivered in one turn.

In a conveyor system adapted for the transfer of a product from a first product carrier to a second product carrier, where the conveyor system comprises a plurality of first product carriers, a plurality of second product carriers, a first product path and a second product path, where the first product carriers are arranged to move along the first product path in a first direction, where the second product carriers are arranged to move along the second product path in the first direction and with a constant first speed, the object of the disclosure is achieved in that a first product carrier is arranged to move with a speed higher than the first speed to a position in which it is aligned with a second product carrier, to move with the first speed next to the second product carrier and to transfer the product to the second product carrier by activating a transfer means when it moves next to the second product carrier, and to move away from the second product carrier with a speed higher than the first speed when the product has been transferred.

By this first embodiment of the conveyor system adapted for the transfer of a product from a first product carrier to a second product according to the disclosure, a conveyor system that allows products to be sorted and distributed in a flexible and efficient manner is provided. In the conveyor system, a product that is to be delivered is moved by a first product carrier along a first product path, and the second product carrier arranged to receive the product is moved along a second product path. The first product path and the second product path are arranged in parallel and adjacent each other at the transfer region, where a product is transferred from the first product carrier to the second product carrier. The first product carrier and the second product carrier are here moved in the same direction.

The second product carrier is arranged to move with a constant first speed along the second product path. The second product path comprises in one example an endless conveyor, e.g. an endless chain or belt conveyor. The second conveyor may comprise spacer means, e.g. teeth, lugs etc., arranged to hold each second product carrier in a defined position on the conveyor.

A second product carrier may also comprise an identification means, e.g. an RFID tag or a bar code, such that it can be identified when required. A second product carrier is e.g. a container or a box.

The first product carrier is arranged to move along the first product path with a variable speed such that the speed and the position of the first product carrier can be controlled. The first product carrier is in one example an automated guided vehicle (AGV) that is provided with wheels and that is self-propelled by an internal motor. An AGV can be controlled to move along a desired path. In the conveyor system, the AGV is controlled to pick up a product at a distribution station. The AGV is then driven to position itself adjacent a second product carrier that is to receive the product. The AGV will move with a speed higher than the first speed in order to catch up with the second product carrier.

When the AGV is aligned with the second product carrier, the AGV is driven with the first speed, such that the AGV moves next to the second product carrier. When the speed difference between the AGV and the second product carrier is zero, the product can be transferred from the AGV to the second product carrier by a transfer means arranged on the AGV. The transfer means may be a tilt function, a motorized belt, a pusher or the like. Since the AGV travels with the same speed as the second product carrier, the product can be transferred to the second product carrier in a secure and smooth manner without damaging the product.

The first product carrier may also be a pallet that is conveyed by a magnetic conveyor. The magnetic conveyor runs in parallel with the second product path at the transfer region. The pallet can be conveyed with a variable speed by the magnetic conveyor, such that it can be positioned next to a second product carrier adapted to receive a product. When the pallet is aligned with the second product carrier, and the pallet moves with the same speed as the second product carrier, a transfer means is activated and the product is transferred to the second product carrier in a secure manner. The pallet is then conveyed back to the distribution station to pick up a new product.

When a product has been transferred, the first product carrier returns to a distribution station and is loaded with a new product. Since the first product carrier can move with a variable speed, it can move fast to position itself at a second product carrier, and can move with the same speed as the second product carrier when the product is transferred. In the conveyor system, several first product carriers move at the same time along the first product path.

In one example, the first product carrier runs in a straight line with the second product path running in parallel. First product carriers with products runs along the first product path and transfers each product to the correct second product carrier. When a second product carrier has received all products and is completed, the second product carrier can exit the second product path at an outfeed region. If the second product carrier has not received all products, the second product carrier can re-enter the second product path at the infeed region for another turn, until it has received all products.

The second conveyor may be provided with some sort of spacer means, such that the position of each second product carrier is fixed on the conveyor. This may be e.g. teeth or lugs arranged at defined positions with a defined spacing. A second product carrier may also comprise an identification means, e.g. an RFID tag or a bar code, such that it can be identified when required. The second product path comprises an endless conveyor, preferably an endless chain conveyor. It may e.g. be a plastic chain conveyor having one or two plastic chains, or a twin track conveyor provided with two metal chains. Since the position of each second product carrier is known, a first product carrier can easily target and follow a second product carrier during the transfer of a product.

The first product path comprises in one example a conventional endless plastic chain conveyor arranged to convey pallets. The first product path further comprises a linear magnetic conveyor adapted to convey pallets using magnetic force. The endless chain conveyor is arranged to move a pallet from a loading position, where a product is picked up from a distribution station, to the magnetic conveyor where the pallet transfers the product to a second product carrier. The magnetic conveyor is arranged to convey a pallet in an asynchronous movement, and the speed of each pallet can be controlled individually. This allows several pallets to transfer products at the same time to different second product carriers. The pallet can travel fast to a required position, where it can travel with the same speed as a second product carrier, and when the product has been transferred, it can travel fast to a return path, where a conventional chain conveyor conveys it back to the distribution station.

In a regular transfer system, each receiving container is positioned in a fixed, specific and predefined position. The products are transferred to the container from a conveyor or self-propelling vehicles, such as AGVs. The control system knows in which position each container is positioned, and a completed container is picked up from this position and forwarded to a predefined manifest location. In this type of system, the containers do not need to be provided with an individual identification, since the container is always positioned in a known predefined position.

When a second product carrier has received all the products, it exits the second product path and is forwarded to a manifest location, where the second product carriers are stored temporarily before they are shipped out to customers.

The deposit location is a dynamic deposit location, which means that there are no fixed storage positions for the different second product carriers.

In a regular deposit location, there are fixed and defined locations for all the different possible destinations. A destination may be e.g. a postal code, a retail location, a customer, etc. In such a system, there must be a reserved position for each destination, regardless of how much or how often each position is used. At the same time, each position must be able to handle the maximal foreseeable amount of containers. The reserved space for each destination may of course differ in dependency of historical data, but there must be a reserved space for each destination. Some spaces may only be used rarely, or the size of the space is most of the times too large. Such a deposit location system will thus require a large space, where most of the space is unused.

In a system according to the disclosure, each second product carrier is provided with an individual identification tag of some sort. Preferably, a wireless transmitter/receiver tag, e.g. an RFID tag, is used, but a bar code or the like is also possible to use. Since each second product carrier can be identified at all times, the position of each second product carrier can be monitored and followed at all times by the control system of the conveyor system. This is useful when the second product carrier are fed to the second product path, and when the second product carrier leave the second product path and are placed in the manifest location. The use of independently identifiable second product carriers allows for a dynamic deposit location, such that fixed and predefined positions for the different destinations are not required. In this way, the deposit location can be made much smaller, which will save a lot of space According to some example embodiments of the sorting system, each second product carrier comprises an individual tagging or identification means. Thereby, the control system can identify the location of a matching second product carrier although the second product carrier is moving, and thus enable a transfer of the product from the first product carrier to the second product carrier at nearly any position along the second conveyor, such that a dynamic deposit location is obtained and no fixed positions for the second product carrier are necessary. As a result, the sorting system may have a more compact design with reduced footprint and reduced cost while providing maintained sorting capacity.

According to some example embodiments, the sorting system further comprises a position monitoring arrangement configured for monitoring the position of the second product carriers located on the second conveyor based on detection of the individual tagging or identification means of the second product carriers. Thereby, the control system can identify the location of a matching second product carrier although the second product carrier is moving.

According to some example embodiments of the sorting system, each second product carrier is assigned to receive an individual predetermined product load from the first product carriers, and wherein the control system is configured to determine a matching second product carrier based on said predetermined product load. Based on information about the identity of the second product carrier and the type of product said second product carrier is assigned to receive, the control system can identify the matching second product carrier.

According to some example embodiments of the sorting system, the control system is configured to determine a position of a matching second product carrier based on the product load carried by the first product carrier. The first product carriers may carry various types of products, and information about the type of product currently carried by the first product may thus be relevant for identifying a matching second product carrier.

According to some example embodiments, the sorting system further comprises a first, synchronous, conveyor arranged to supply first product carriers carrying products from a product source location to the entry location of the asynchronous conveyor, and to return unloaded first product carriers from the exit location of the asynchronous conveyor to the product source location, wherein the first, asynchronous, conveyor and the first synchronous, conveyor jointly defines a first product path. The use of a first, synchronous, conveyor for collecting products from the product source location may reduce overall cost and increase flexibility, because conventional chain conveyers and other types of synchronous conveyors are low cost and enables high flexibility in control and routing.

According to some example embodiments of the sorting system, the second conveyor is a synchronous conveyor or an asynchronous conveyor. A synchronous conveyor has low cost, low maintenance and enables high flexibility in control and routing. On the other hand, an asynchronous conveyor enables individual speed control and thus more advanced and intelligent control of the second product carriers, such that increased productivity may be accomplished.

According to some example embodiments of the sorting system, the control system is arranged to automatically dispatch an individual second product carrier from the circulating path of the second conveyor when said individual second product carrier has received the predetermined product load assigned for said individual second product carrier. Thereby, the number of second product carriers circulating on the second conveyor is kept low, and enables supply of new, empty, second product carriers on the second conveyer, all without manual interaction, for providing high productivity.

According to some example embodiments of the sorting system, the control system is arranged to control the second conveyor to keep each individual second product carrier on the circulating path of the second conveyor until said individual second product carrier has received the predetermined product load assigned for said individual second product carrier. The second product carrier is thus maintained on the circulating path without having to stop forward motion of the second product carrier, thereby enabling other second product carriers to be dispatched from the second conveyer. Consequently, this solution provides high throughput of the sorting system.

According to some example embodiments, the sorting system is configured to receive individual orders or instructions for distributing products from the product source location to a product target location, and wherein the sorting system is arranged to assign the one or more products of said individual orders or instructions to one or more second product carriers. An individual order or instruction for distributing products from the product source location to a product target location may for example be received from a customer, such as an external customer of a company or an internal customer within a company. The control system may thus determine what kind of product that each second product carrier is requesting, based on the identity of the second product carrier and said product assignment information.

According to some example embodiments, the sorting system comprises a buffer for temporarily buffering a plurality of second product carriers while waiting for a new sorting task, wherein the sorting system is configured to, upon receiving a new individual order or instruction for distributing one or more products from the product source location to a product target location, assign one or more second product carriers located in the buffer to carry out said individual order or instruction. Thereby, only second product carriers having a non-finished sorting task are routed to the second conveyer, for ensuring high sorting efficiency.

According to some example embodiments of the sorting system, the one or more second product carriers that are assigned to carry out said individual order or instruction, are conveyed from a temporary buffer location to the infeed region and further to the circulating path, and wherein each of said one or more second product carriers after having received the predetermined product load, is dispatched from the circulating path and conveyed to the product target location for delivery of the product load. Thereby, only second product carriers having a non-finished sorting task are routed to the second conveyer, for ensuring high sorting efficiency.

According to some example embodiments of the sorting system, said one or more second product carriers, after delivery of the product load at the product target location, are conveyed back to the buffer for awaiting for a new sorting task. Thereby, only second product carriers having a non-finished sorting task are routed to the second conveyer, for ensuring high sorting efficiency.

According to some example embodiments of the sorting system, the first, asynchronous, conveyor is a linear magnetic conveyor.

According to some example embodiments of the sorting system, the second conveyor is arranged to convey the second product carrier with a constant first speed. This enables a cost-efficient implementation of the second conveyer.

According to some example embodiments of the sorting system, the first product carriers are provided with magnetic means such that they can be conveyed by the linear magnetic conveyor.

According to some example embodiments of the sorting system, the first, asynchronous, conveyor forms a closed loop. Thereby, a first product carrier that fails arriving at a matching second product carrier during the first round may benefit from the closed loop design and re-enter the first, asynchronous, conveyor, such that the first product carrier may reach a matching second product carrier during the second round, and not having the return to the product source location while carrying the product.

According to some example embodiments of the sorting system, the first, synchronous, conveyor starts and ends at the first, asynchronous, conveyor.

According to some example embodiments of the sorting system, the infeed region and the outfeed region are positioned at a level below the linear magnetic conveyor. This enables positioning of the second conveyor also on the inside of the loop of the first, asynchronous, conveyor.

According to some example embodiments of the sorting system, the second product path runs on the outside of the linear magnetic conveyor. This enables a more simply design of the second conveyer.

According to some example embodiments of the sorting system, the linear magnetic conveyor comprises at least two busbars arranged to conduct a voltage to the carrier.

According to some example embodiments of the sorting system, at least one busbar is divided in a plurality of controllable sections.

According to some example embodiments of the method for distributing products from a product source location to a target location, the method further comprises monitoring of the position of the second product carriers located on the second conveyor based on detection of individual tagging or identification means of the second product carriers.

According to some example embodiments, the method comprises assigning each second product carrier to receive an individual predetermined product load from the first product carriers, and determining a matching second product carrier based on said predetermined product load.

According to some example embodiments, the method comprises determining a position of a matching second product carrier based on the product load carried by the first product carrier.

According to some example embodiments, the method comprises supplying first product carriers carrying products from a product source location to the entry location of the asynchronous conveyor by means of a first, synchronous, conveyor, and returning unloaded first product carriers from the exit location of the asynchronous conveyor to the product source location by means of a first, synchronous, conveyor, wherein the first, asynchronous, conveyor and the first synchronous, conveyor jointly defines a first product path.

According to some example embodiments, the method comprises automatic dispatching an individual second product carrier from the circulating path of the second conveyor when said individual second product carrier has received the predetermined product load assigned for said individual second product carrier.

According to some example embodiments, the method comprises keeping each individual second product carrier on the circulating path of the second conveyor until said individual second product carrier has received the predetermined product load assigned for said individual second product carrier.

According to some example embodiments, the method comprises receiving individual orders or instructions for distributing products from the product source location to a product target location, and assigning each product of said individual orders or instructions to second product carriers.

According to some example embodiments, the method comprises temporarily buffering a plurality of second product carriers in a buffer while waiting for a new sorting task, and upon receiving a new individual order or instruction for distributing one or more products from the product source location to a product target location, assigning one or more second product carriers located in the buffer to carry out said individual order or instruction.

According to some example embodiments, the method comprises conveying the one or more second product carriers that are assigned to carry out said individual order or instruction from the buffer to the infeed region and further to the circulating path, and individually dispatching said one or more second product carriers from the circulating path after having received the predetermined product load, and conveying said one or more second product carriers to the product target location for delivery of the product load.

According to some example embodiments, the method comprises, after delivery of the product load at the product target location, conveying said one or more second product carriers back to the buffer for awaiting for a new sorting task.

According to some example embodiments, the method comprises conveying the second product carriers with a constant first speed by means of the second conveyor.

According to some example embodiments, the first, asynchronous, conveyer is a linear magnetic conveyor, wherein the method further comprises providing the first product carriers with magnetic means such that they can be conveyed by the linear magnetic conveyor.

According to some example embodiments, the method further comprises: conveying a second product carrier by the second conveyor with a constant first speed; conveying a first product carrier by the linear magnetic conveyor with a speed that is higher than the first speed until the first product carrier is positioned at the side of the second product carrier; conveying the first product carrier with the same speed as the second product carrier; activating a transfer means of the first product carrier such that the product is transferred from the first product carrier to the second product carrier; and conveying the first product carrier with a speed that is higher than the first speed.

According to some example embodiments, the method comprises conveying the first product carrier to the first, asynchronous, conveyor by a synchronous conveyor, and conveying the first product carrier from the first, asynchronous, conveyor by the synchronous conveyor.

BRIEF DESCRIPTION OF DRAWINGS

The system and method according to the disclosure will be described in greater detail in the following, with reference to the embodiments that are shown in the attached drawings, in which.

DETAILED DESCRIPTION

The embodiments of the disclosure with further developments described in the following are to be regarded only as examples and are in no way to limit the scope of the protection provided by the patent claims. References such as longitudinal, horizontal, vertical, right, left etc. refer to directions of a conveyor in normal use.

Figure 1:
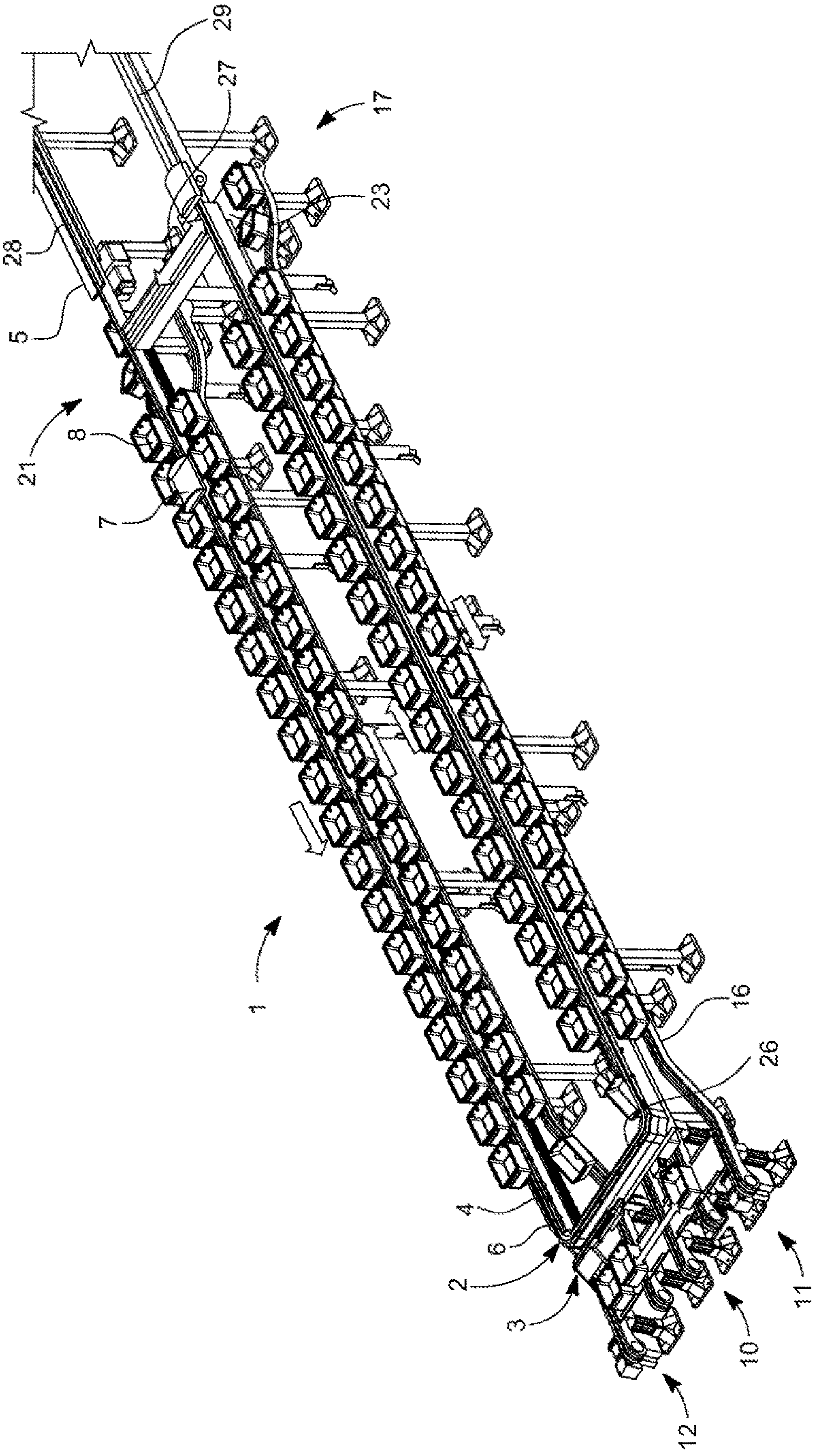
FIG. 1 shows a sorting and conveyor system according to the disclosure.
Figure 2:
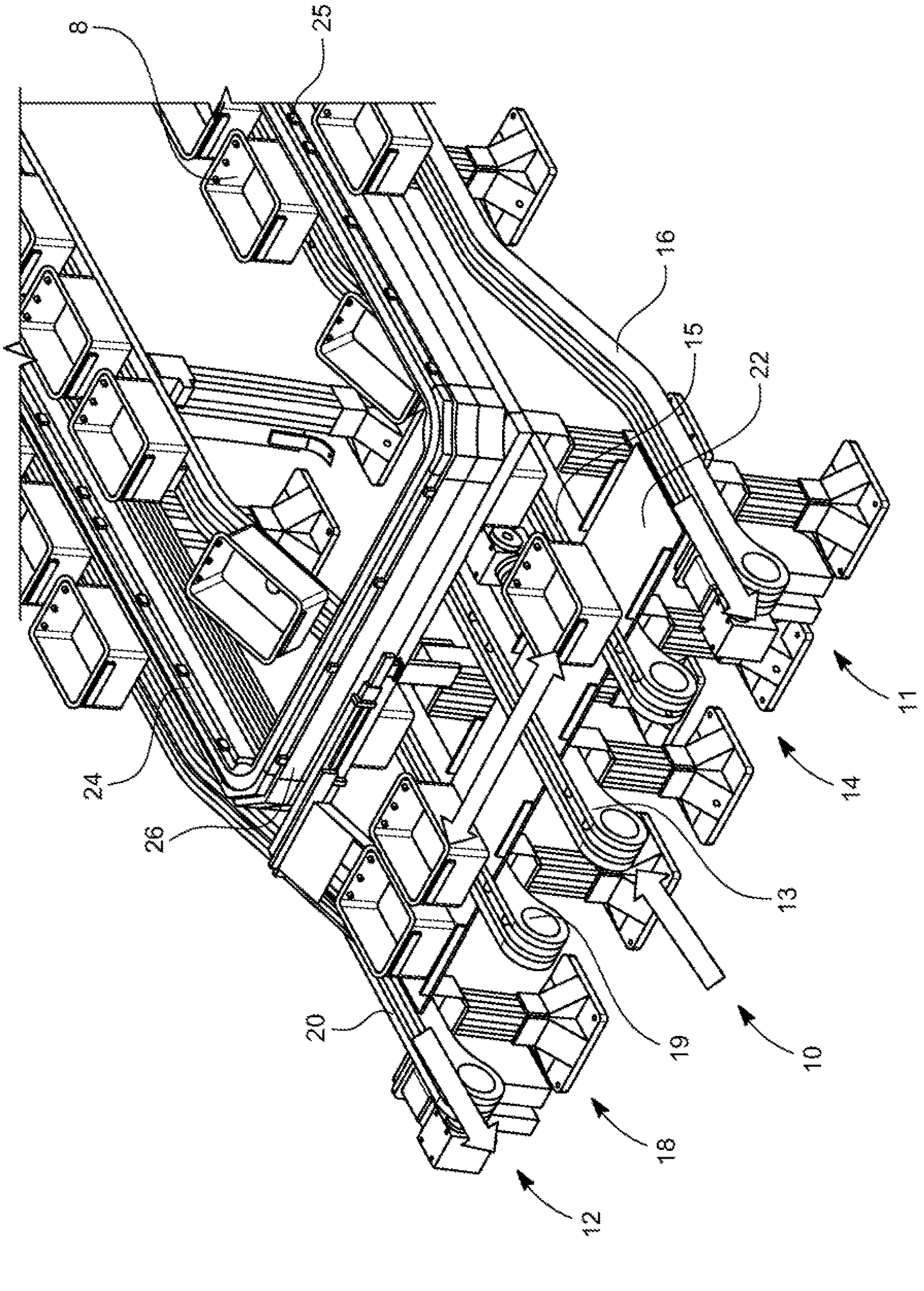
FIG. 2 shows a detail of a sorting and conveyor system according to the disclosure.
Figure 3:
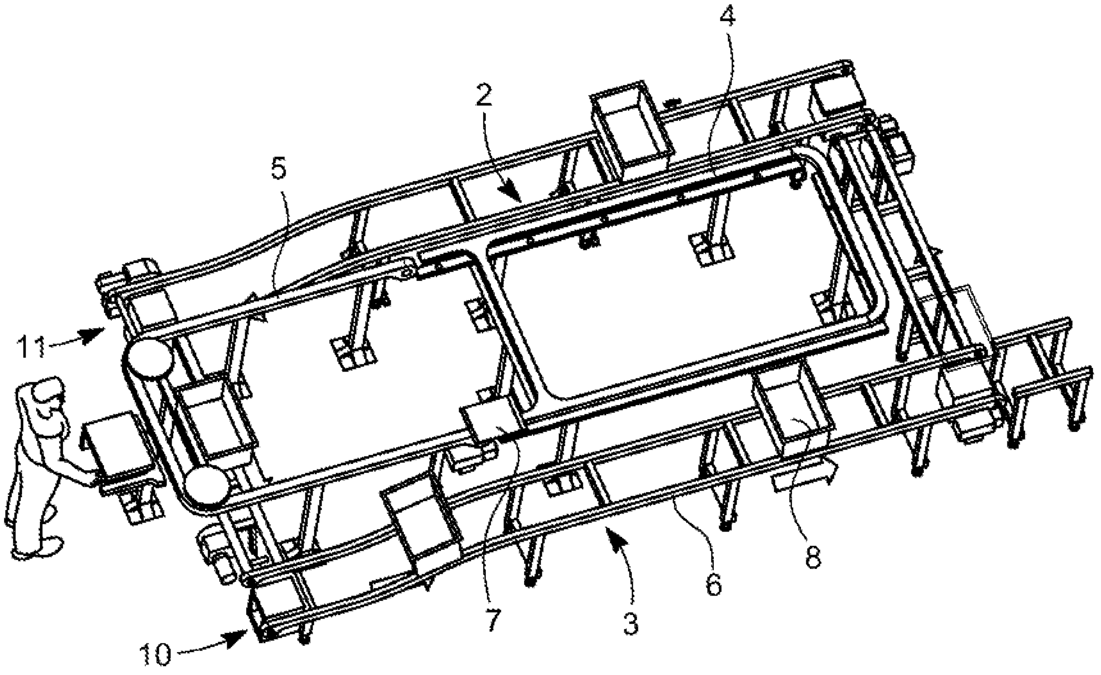
FIG. 3-4 shows a simplified sorting and conveyor system according to the disclosure.
Figure 4:
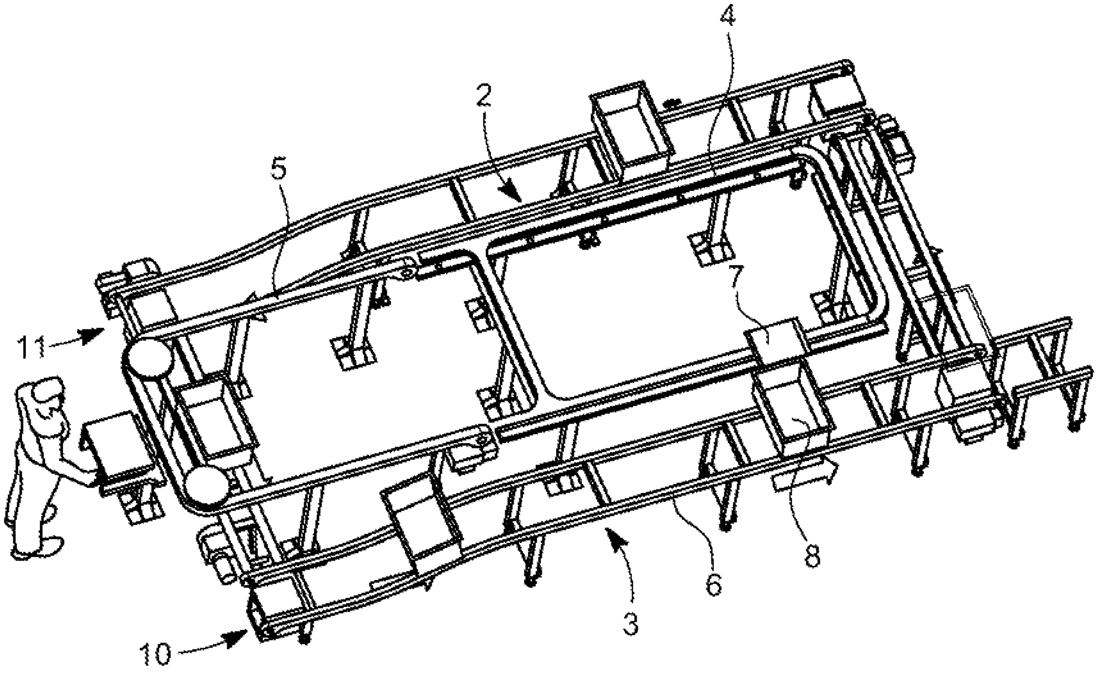
Figure 5:
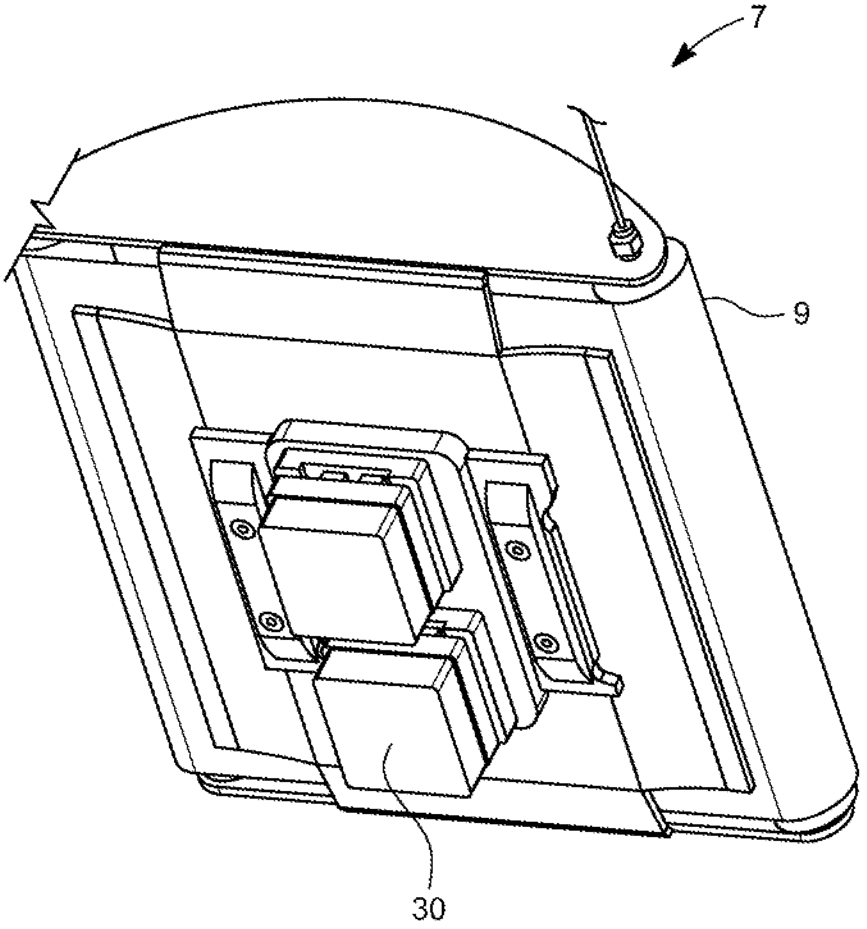
FIG. 5 shows a carrier for the sorting or conveyor system according to the disclosure.
Figure 6:
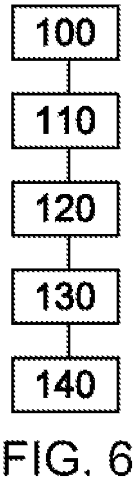
FIG. 6 shows a flow chart for the method according to the disclosure.
Figure 7:
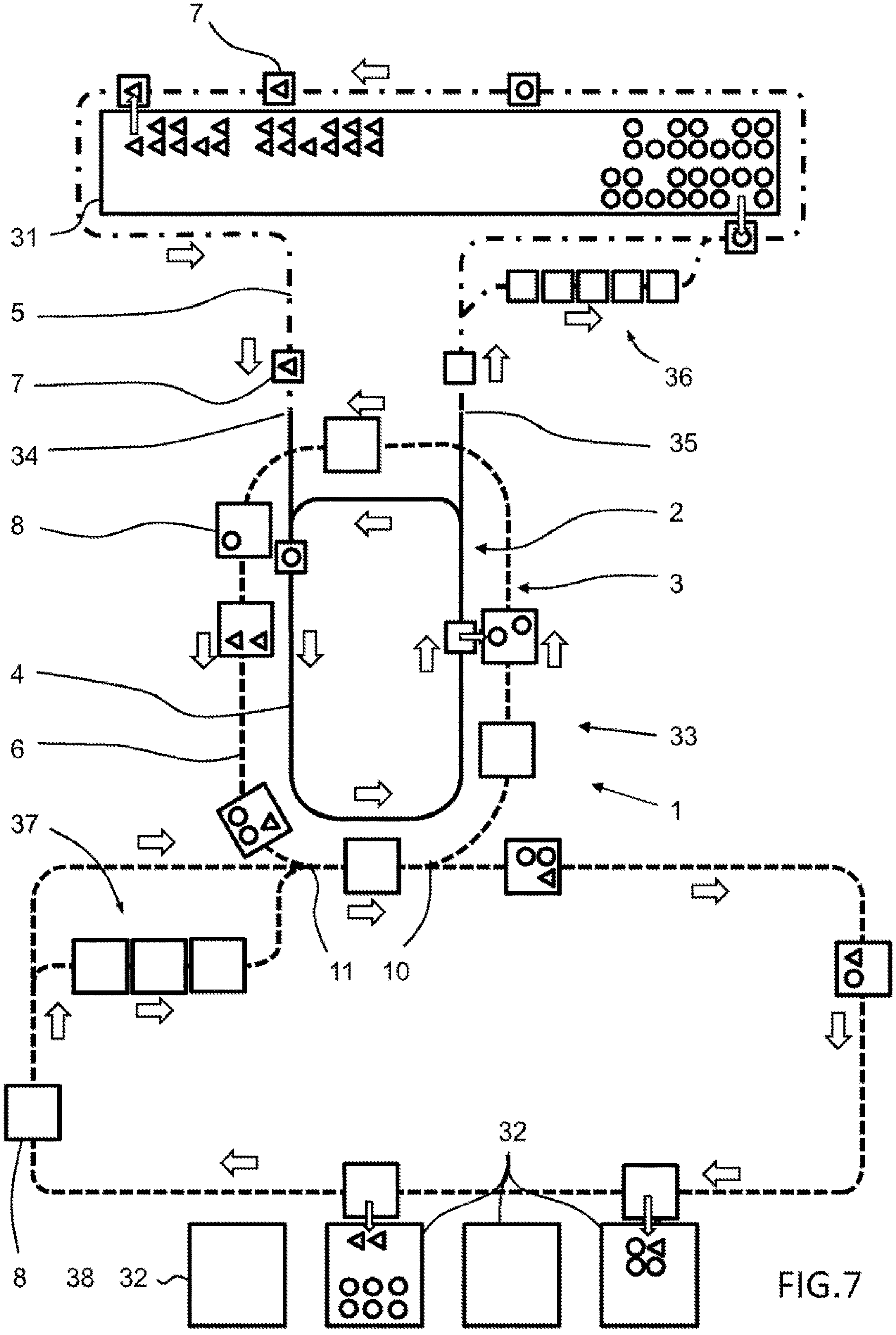
FIG. 7 shows an overview of a sorting system according to the disclosure.

FIGS. 1 and 2 show a sorting and conveyor system according to the disclosure, FIGS. 3-4 show a simplified sorting system, FIG. 5 shows a carrier to be used in the sorting and conveyor system, and FIG. 6 shows a flowchart for the method, and an FIG. 7 shows an overview of a sorting system according to the disclosure.

According to some example embodiments of the present disclosure, the sorting system 1 comprises a first product path 2, a second product path 3, and a plurality of carriers 7. According to some other example embodiments of the present disclosure, the conveyor system 1 comprises a first product path 2, a second product path 3, a plurality of first product carriers 7 and a plurality of second product carriers 8, here represented by containers.

The first product carrier 7 is moved along the first product path 2. The first product path is used to deliver products from a distribution station to the second product carriers. The second product carriers are moved along the second product path 3. At the transfer region, where a product is transferred from a first product carrier 7 to a second product carrier 8, the first product path 2 and the second product path 3 are arranged next to each other, where they run in parallel with each other. The second product carriers 8 conveyed by the second product path 3 are conveyed with a constant first speed.

In one example, the first product carrier is an automated guided vehicle (AGV) that is provided with wheels and that is self-propelled by an internal motor. An AGV can be controlled to move along a desired path. In the conveyor system, the AGV is controlled to pick up a product at a distribution station. The AGV is then driven to position itself adjacent a second product carrier that is to receive the product. The AGV will move with a speed higher than the first speed in order to catch up with the second product carrier.

When the AGV is aligned with the second product carrier 8, the AGV is driven with the first speed, such that the AGV moves next to the second product carrier. When the speed difference between the AGV and the second product carrier is zero, the product can be transferred from the AGV to the second product carrier by a transfer means arranged on the AGV. The transfer means may be a tilt function, a motorized belt, a pusher or the like. Since the AGV travels with the same speed as the second product carrier, the product can be transferred to the second product carrier in a secure and smooth manner without damaging the product.

The AGV's run on a smooth surface and may follow predefined tracks or are controlled to run spaced apart from the second product path until a product is to be transferred. The AGV may then change lane and move directly next to the second product carrier to transfer the product.

When the product is transferred, the AGV returns to the previous lane to return to the distribution station.

In some example embodiments of the present disclosure, the first product carrier 7 is a pallet.

Moreover, in some example embodiments of the present disclosure, the second product carrier 8 is a container.

According to some example embodiments, the first product path 2 comprises a first, asynchronous, conveyor in form of a linear magnetic motion conveyor 4, and a first, synchronous, conveyor in form of a first endless chain conveyor 5. The linear magnetic motion conveyor is in the shown example a flatbed magnet conveyor that will move a carrier or pallet supported by guide rails. Such a magnetic conveyor comprises straight sections and curved sections and may also comprise diverter sections. The magnetic conveyor is able to control the speed and position of several carriers or pallets at the same time. At least part of the magnetic conveyor is arranged adjacent and in parallel with the second conveyor 6 or second product path 3, such that a carrier or pallet can follow a container 8 conveyed by the second conveyor 6.

The first endless chain conveyor 5 is arranged to convey carriers or pallets 7 from a product distribution station to the magnetic conveyor. At the product distribution station, a product is transferred from a central storage to the carrier or pallet. The product distribution station may comprise several different pick-up positions where a product is placed on a carrier or pallet. Normally, a carrier or pallet carries one product at the time, but it would be possible to carry several smaller products at the same time. The product distribution station may be positioned at a relatively long distance from the transfer station where the magnet conveyor transfers products from the carrier or pallet to a container. The distance from the product distribution station to the transfer station and the distance from the transfer station to the product distribution station is thus handled by a regular plastic chain conveyor that conveys the carriers or pallets in a conventional manner. The first endless chain conveyor may comprise straight tracks, curved tracks, diverters, mergers, buffers and the like, depending on the requirements. A carrier or pallet may also comprise an identification means, e.g. an RFID tag, such that it can be identified when required.

In the example of a first product path 2 as shown in FIG. 1, the magnetic conveyor 4 comprises four branches, a forward magnetic conveyor 24, a return magnetic conveyor 25, a first transverse magnetic conveyor 26 and a second transverse magnetic conveyor 27. The first endless conveyor 5 comprises an endless delivery conveyor 28 and an endless return conveyor 29. The endless delivery conveyor 28 conveys carriers or pallets 7 with loaded products to the magnetic conveyor, and the endless return conveyor returns empty carriers or pallets to the product distribution station, where new products are loaded on the carriers or pallets.

When a carrier or pallet with a product arrives at the magnetic conveyor 4, it will first be conveyed by the forward magnetic conveyor 24. In the shown example, the carriers or pallets are conveyed in an anti-clockwise direction by the magnetic conveyor 4. At the forward magnetic conveyor 24, a carrier or pallet will travel in the same direction as the containers conveyed by the return B conveyor 20. If the product should be transferred to a container on the return B conveyor, the carrier or pallet is conveyed to that container with a high speed. At the container, when the carrier or pallet is adjacent the container, the carrier or pallet is conveyed with the same speed as the container, and the transfer means 9 is activated such that the product falls from the transfer means into the container. When the transfer is completed, the carrier or pallet is conveyed to the endless return conveyor 29.

The empty carrier or pallet may either be conveyed in an anti-clockwise direction from the forward magnetic conveyor 24 via the first transverse magnetic conveyor 26 to the return magnetic conveyor 25 to the endless return conveyor 29. Depending on the position on the forward magnetic conveyor, the carrier or pallet may also be conveyed backwards on the forward magnetic conveyor 24 to the second transverse magnetic conveyor 27 where it is returned to the endless return conveyor 29.

If the product should not be transferred to a container on the return B conveyor, the carrier or pallet is conveyed further via the first transverse magnetic conveyor 26 to the return magnetic conveyor 25 with a high speed. At the return magnetic conveyor 25, the carrier or pallet will travel in the same direction as containers on the forward A conveyor 15. When the carrier or pallet s adjacent the container to which the product is to be transferred, the carrier or pallet is conveyed with the same speed as the container, and the transfer means 9 is activated such that the product falls from the transfer means into the container. When the transfer is completed, the carrier or pallet is conveyed to the endless return conveyor 29.

In a product flow using several carriers or pallets to deliver products at the same time, it is of advantage to convey all carriers or pallets in the same direction. By using several carriers or pallets at the same time, a few carrier or pallet trains will form on the magnetic conveyor. When a carrier or pallet slows down to transfer a product to a container, all following carriers or pallets will also slow down to the same speed. When the product has been transferred, the first carrier or pallet and the following carriers or pallets can resume a high speed until another carrier or pallet is in position to transfer a product. The following carriers or pallets will now also slow down until the product has been transferred. These dynamic carrier or pallet trains will form and disappear until the carriers or pallets enter the endless return conveyor, where they are all conveyed with the same speed by the endless conveyor.

The second product path 3 comprises a second conveyor 6, which may be an endless chain conveyor. It may e.g. be a plastic chain conveyor having one or two plastic chains. The second conveyor may also consist of several straight belt conveyors, or twin track conveyors provided with two metal chains. The advantage of using plastic chain conveyors is that such conveyors can run around bends, which simplifies the sorting system. Such conveyors can also run up and down in a vertical direction, which may be of advantage if the conveyor must pass another conveyor. Depending on the length of the second conveyor, it may also consist of several endless plastic chain conveyors. The second conveyor is arranged to convey containers 8 adapted to receive products. A container 8 may be any type of container or box that can be conveyed on the second conveyor, and that is suitable for receiving products delivered by a carrier or pallet.

The second conveyor is arranged to convey the containers with a constant, synchronous speed.

In this way, the position of each container can be determined by the control system in a predictable way. In order to be able to predict the position of a container, the second conveyor may be provided with some sort of spacer means, such that the position of each container is fixed on the conveyor and such that the container cannot slip or move. This may be e.g. teeth or lugs arranged at defined distances. Each container may also be provided with an identification means, e.g. an RFID tag or a bar code, such that the position of each container can be detected. With the position of each container being known, a carrier or pallet can easily target and follow a container during the transfer of a product.

In the example shown in FIGS. 1 and 2, the second product path 3 comprises two second conveyors, an A conveyor 14 and a B conveyor 18. The A conveyor 14 comprises a forward A conveyor 15, a return A conveyor 16 and a turning A region 17. The B conveyor 18 comprises a forward B conveyor 19, a return B conveyor 20 and a turning B region 21. An empty container 8 enters the sorting system at an infeed region 10, e.g. on an infeed conveyor 13 or from a vertical storage. At the infeed region, empty containers may be buffered until they can be forwarded to the either the forward A conveyor or the forward B conveyor. The infeed region 10 comprises a first transverse conveyor 22 that can convey a container in a sideway direction. The first transverse conveyor 22 may consist of several short conveyor paths. An empty container is e.g. forwarded to the forward A conveyor 15 from the infeed conveyor by the first transverse conveyor when there is an empty slot in the forward A conveyor, or when there is a need for an empty container. The infeed region is in the shown example positioned at a lower level, below the magnetic conveyor 4. From the infeed region, the forward A conveyor runs upwards in a vertical direction to a height position in which the upper level of a container is slightly below the transfer means of a carrier or pallet. The identity of an empty container may be read at the infeed region, such that the control system can determine the actual position of the container throughout the second product path.

The forward A conveyor 15 runs along the magnetic conveyor to a turning A region 17, where the A conveyor 14 makes a turn by 180 degrees. In the shown example, the forward A conveyor 15 runs inside the magnetic conveyor, and runs in a clockwise direction when seen from above.

The turning A region may comprise a second transverse conveyor 23 which conveys the containers in a sideway direction. The turning region may also comprise a 180 degree turn if the A conveyor is an endless plastic conveyor chain. In the shown example, the turning region is also positioned at a lower level, such that the container can pass under the magnetic conveyor. From the turning region, the return A conveyor 16 returns the container to the first outfeed region 11. At the first outfeed region, the container may either leave the A conveyor, or may be returned to the forward A conveyor by the first transverse conveyor 22. A partly filled container may be forwarded to the forward A conveyor for another turn, if the container was not completed in the first turn.

An empty container may also be forwarded to the forward B conveyor 19 from the infeed conveyor by the first transverse conveyor. From the infeed region, the forward B conveyor runs upwards in a vertical direction to a height position in which the upper level of a container is slightly below the transfer means of a carrier or pallet. The forward B conveyor 19 runs along the magnetic conveyor to a turning B region 21 where the B conveyor 18 makes a turn by 180 degrees. In the shown example, the forward B conveyor 19 runs inside the magnetic conveyor, and runs in an anti-clockwise direction when seen from above. The turning B region may also comprise the second transverse conveyor 23 which conveys the containers in a sideway direction, or may comprise a 180 degree turn if the B conveyor is an endless plastic conveyor chain. In the shown example, the turning region is also positioned at a lower level, such that the container can pass under the magnetic conveyor. From the turning region, the return B conveyor 20 returns the container to a second outfeed region 12. At the second outfeed region, the container may either leave the B conveyor, or may be returned to the forward B conveyor by the first transverse conveyor 22. A partly filled container may also be forwarded to the forward B conveyor from the return conveyor for another turn, if the container was not completed in the first turn.

The first outfeed region 11 and the second outfeed region 12 are used to exit completed containers, i.e. containers that have received all the foreseen products. A completed container is forwarded from an outfeed region to a manifest location or target location, e.g. by a further chain conveyor.

At the manifest location, the container may be stored temporarily before it is shipped out to the customers or sent to a consumer, or before the products carried by the container are being used in a subsequent process.

A carrier or pallet 7 is arranged to be conveyed by both the magnetic conveyor 4 and the first endless chain conveyor 5. The carrier or pallet may resemble a conventional pallet adapted to be conveyed by an endless chain conveyor, but is also provided with a magnetic means 30 in the base of the carrier or pallet. The magnetic means may e.g. be a magnetic metal or a permanent magnet of some kind. The linear magnetic motor of the magnetic conveyor will create a magnetic field that moves the carrier or pallet. The carrier or pallet is further provided with a transfer means 9 that is arranged to transfer a product positioned on the carrier or pallet to a receiving container 8 moving on the second conveyor. The transfer means may be e.g. a tilt function, a belt function or a pusher of some type.

The magnetic conveyor 4 comprises a linear motor that can drive the carrier or pallet in the direction of the product flow of the sorting system. The linear motor comprises a plurality of magnetic coils that can control the movement of the carrier or pallet at the magnetic conveyor. The magnetic conveyor can drive and position the carrier or pallet with a very high precision and with a high speed.

The transfer means is actuated by an actuator arranged in the carrier or pallet. The actuator is preferably an electric actuator, e.g. an electric motor or an electric linear actuator, such as a solenoid. The actuator may be powered by an external power source or a power source arranged in the carrier or pallet. For an external power source, the carrier or pallet is provided with sliding contacts that interacts with at least two busbars arranged at the magnetic conveyor. A busbar may e.g. conduct a zero potential and will act as a ground reference. In one example, a second busbar may conduct a positive voltage, e.g. 24 volt DC, A third busbar may conduct a negative voltage, e.g.—24 volt DC. To transfer a product in one direction, the positive busbar is activated such that a DC motor of the transfer means rotates in a first direction. This will transfer the product in a first direction, e.g. to the right. To transfer a product in the other direction, the negative busbar is activated such that the DC motor of the transfer means rotates in a second direction. This will transfer the product in a second direction, e.g. to the left.

In the shown example, the busbars are provided with a plurality of controllable sections, where a section can be activated if the transfer means should transfer a product. When the carrier or pallet is at a suitable position for a transfer, a busbar section is activated such that the transfer means is actuated and the product is transferred to the correct container. Such a passive carrier or pallet is a simple and cost-effective solution.

In another example, the magnetic conveyor is provided with two busbars. The busbars may either conduct a DC voltage, e.g. 24 volt DC, or an AC voltage, e.g. 24 volt AC. The sliding contacts of the carrier or pallet is constantly in contact with the busbars, such that the carrier or pallet is always energized. The voltage may power a control unit of the carrier or pallet, which may comprise a wireless receiver that will receive a transfer signal when the transfer means is to transfer a product. The busbar may also transfer a high frequency control signal to each carrier or pallet. The transfer signal will trigger the actuator of the transfer means, such that the product is transferred at the proper moment. It is also possible to provide the carrier or pallet with a rechargeable battery and an electronic control unit that can be instructed to transfer a product, e.g. via a wireless control signal.

When a product is to be transferred from a carrier or pallet to a container, the carrier or pallet is controlled to a position at the side of the container. The carrier or pallet is run with a high speed until it is positioned at the side of the container. When it has reached this position, the speed of the carrier or pallet is controlled to correspond to the speed of the container. The speed of the container and thus of the second conveyor is known, and the carrier or pallet is controlled to run with the same speed. In FIG. 3, the carrier or pallet 7 has picked up a product from an operator and has been conveyed to the magnetic conveyor 4 by a first chain conveyor 5. The carrier or pallet is now conveyed with a high speed to the container 8, such that the carrier or pallet is positioned at the side of the container, and such that the carrier or pallet travels with the same speed as the container, as is shown in FIG. 4.

When the carrier or pallet and the container moves with the same speed, the product is transferred to the container in a controlled manner. In this way, there is no risk that the product ends up outside of the container. When the product has been transferred, the carrier or pallet is returned to the product distribution station via the second product path to pick up a new product. The location where the actual product transfer takes place is also known as the deposit location. This corresponds in FIG. 4 to the position of carrier or pallet 7 and the position of the container 8.

The time point of arrival of carrier or pallet 7 to the magnetic conveyor 4 is not synchronized with the motion of the containers 8 located on the second endless conveyor 6. Hence, a suitable container 8 for receiving the product carried by the carrier or pallet 7 may, at time point of arrival of carrier or pallet 7 to the magnetic conveyor 4, be located virtually anywhere along the length of the second endless conveyor 6.

Furthermore, the transfer means 9 required for transferring the product from the carrier or pallet 7 is preferably, but not strictly necessary, flexible in terms of transfer position.

Consequently, the actual transfer position, i.e. deposit position, may generally take place at any location along a significant portion of the second endless conveyor 6, namely where the magnetic conveyor 4 and second endless conveyor 6 are running closely side by side in parallel relationship.

The motion control of a carrier or pallet 7 along the magnetic conveyor 4 can be implemented in various ways. For example, each carrier or pallet 7 may be driven forwards with a constant speed that is higher than the container speed until the carrier or pallet 7 catches up a container dedicated for collecting products that the carrier or pallet 7 is loaded with. When this occurs, the carrier slowdowns to have the same speed as the container 8, activates a transfer means 9 of the carrier 7 such that the product is transferred from the carrier 7 to the container 8, and subsequently increasing the speed of the carrier 7 to the earlier faster constant speed.

Based on such an example motion control, the deposit location would clearly be more or less randomly distributed along the length of second endless conveyor 6, where a transfer is possible, for each consecutive carrier or pallet 7. This is referred to as a dynamic deposit location, because the deposit location is not fixed, but varies generally for each consecutive carrier or pallet 7 that arrives to the magnetic conveyor 4. In the shown example, the deposit location is a dynamic deposit location, which means that there are no fixed storage positions for the different containers. In a regular deposit location, there are fixed and defined locations for all the different possible destinations, which takes up unnecessary space that is rarely used. In the present system, each container is provided with an individual identification tag of some sort. Preferably, a wireless transmitter/receiver tag, e.g. an RFID tag, is used, but a bar code or the like is also possible to use. Since each container can be identified at all times, the position of each container can be monitored and followed at all times by the control system of the conveyor system. The use of independently identifiable containers allows for a dynamic deposit location, such that fixed and predefined positions for the different containers are not required.

In this way, the deposit location can be made much smaller, which will save a lot of space.

In one example, the manifest location is configured in dependency of the planned deliveries for a specific time period. A time period may e.g. be one or a few hours or a day, depending on the throughput of the distribution centre. For this time period, the number of different destinations and the number of containers for each destination are known. The control system can thus prepare positions for each container at the manifest location, e.g. by allocating sufficient space for each destination in a buffer or the like. Depending on the number of different destinations, the containers can also be forwarded to predefined locations at the manifest location.

It is also possible that the containers for the different destinations are delivered at different times. In this case, when the containers for a destination has been delivered, this space can be used for a new destination. By using a dynamic buffer, the storage space can be reduced to a minimum. At the manifest location, the content in a container may be forwarded directly to a customer in that container. This is e.g. possible if the customer is close and a specific delivery service is used, where the content must not be packed in a box. This could e.g. be shops that can receive the containers and return the empty containers. In another example, the content in a container is transferred to a box of some sort that is then placed in a delivery storage, e.g. for postal distribution. When a container is emptied, the space can be used by another container.

In the method for transferring a product from a carrier to a container according to the disclosure, the container is conveyed in a first direction by a second conveyor and the carrier is conveyed in the same direction by a magnetic conveyor. The second conveyor and the magnetic conveyor are positioned in parallel and adjacent to each other. The carrier is provided with a carrying surface provided with a transfer means, and the carrying surface is positioned with a height that is above the upper rim of the container.

FIG. 6 shows the basic steps of an example method for transferring a product from a first product carrier, such as a carrier, to a second product carrier, such as a container. In step 100, the container is conveyed by the second conveyor with a constant first speed. The second conveyor may be a chain or belt conveyor on which the container is standing. The conveyor may be provided with spacer means, e.g. teeth, such that the position of each container is predefined and the container does not slip on the conveyor.

In step 110, the carrier is conveyed by the magnetic conveyor with a speed that is higher than the first speed of the second conveyor until the carrier is positioned at the side of the container.

In this way, the carrier will catch up with the container.

In step 120, the carrier is conveyed with the same speed as the second conveyor. In this way, the carrier and the container will travel with the same speed side by side.

In step 130, a transfer means of the carrier is activated such that the product is transferred from the carrier to the container. Since the carrier and the container are positioned side by side and travel with the same speed, the transfer of the product is reliable and there is no risk that the product will fall outside of the container.

In step 140, the carrier is conveyed with a speed that is higher than the first speed of the second conveyor. The empty carrier can now be conveyed away from the container by the magnetic conveyor with a high speed, leaving space for other carriers to transfer products to other containers.

The carrier is preferably conveyed to the magnetic conveyor by an endless chain conveyor, and from the magnetic conveyor by an endless chain conveyor. The carriers collect products at a product distribution station positioned at a distance from the magnetic conveyor, and an endless chain conveyor is much more cost-effective for longer conveyor paths.

According to alternative example embodiment of, the method for transferring a product from a first product carrier to a second product carrier, the first product carrier travels in a first direction and the second product carrier travels in the same direction. The first product carrier travels along a first product path, and the second product carrier travels along a second product path, where the first product path is adjacent and parallel with the second product path. The first product carrier is provided with a carrying surface provided with a transfer means, and the carrying surface is positioned with a height that is above the upper rim of the second product carrier.

In step 100, the second product carrier is moved with a constant first speed. The second product carrier may be conveyed by a second endless conveyor with a constant first speed. The second conveyor is e.g. a chain or belt conveyor on which the second product carrier is standing. The second conveyor is provided with spacer means, e.g. teeth or lugs, such that the position of each second product carrier is well defined and the second product carrier does not slip on the conveyor.

In step 110, the first product carrier is moved with a speed that is higher than the first speed until the first product carrier is positioned next to the second product carrier. In this way, the first product carrier will catch up with the second product carrier and will align with the second product carrier.

In step 120, the first product carrier pallet is moved with the first speed, such that the first product carrier is aligned with the second product carrier. In this way, the first product carrier and the second product carrier will move with the same speed side by side.

In step 130, a transfer means of the first product carrier is activated such that the product is transferred from the first product carrier to the second product carrier. Since the first product carrier and the second product carrier are aligned with each other and move with the same speed, the transfer of the product is reliable and there is no risk that the product is damaged or will fall outside of the second product carrier.

In step 140, the first product carrier is moved away from the second product carrier with a speed that is higher than the first speed. The empty first product carrier can now be moved away from the second product carrier with a high speed, leaving space for other first product carriers to transfer products to other second product carrier.

The first product carrier is either an AGV moving by itself or a pallet conveyed by a magnetic conveyor. The first product carrier collects products at a distribution station positioned at a distance from the transfer region. The second product carrier may also be an AGV moving by itself or a container conveyed by an endless conveyor.

According to a further example embodiment of the method for transferring a product from a first product carrier to a second product carrier, the second product carrier is conveyed in a first direction by a second conveyor and the first product carrier is conveyed in the same direction by a magnetic conveyor. The second conveyor and the magnetic conveyor are positioned in parallel and adjacent to each other. The first product carrier is provided with a carrying surface provided with a transfer means, and the carrying surface is positioned with a height that is above the upper rim of the second product carrier.

The steps of said further example embodiment of the method are provided below. In this example embodiment, the first product carrier may be a carrier, and the second product carrier may be a container.

In a first step, the container is conveyed by the second conveyor with a constant first speed.

The second conveyor may be a chain or belt conveyor on which the container is standing. The conveyor may be provided with spacer means, e.g. teeth, such that the position of each container is predefined and the container does not slip on the conveyor.

In a second step, the carrier is conveyed by the magnetic conveyor with a speed that is higher than the first speed of the second conveyor until the carrier has passed the container, i.e. driven past the container. In this way, the carrier will located in front of the container, as seen in the direction of travel.

In a third step, the carrier is slowed down to a speed that is lower than the first speed of the second conveyor. In this way, the container will start to approach the stationary carrier from behind. The carrier is for example slowed down to a speed that is lower than 50%, specifically lower than 10%, of the first speed of the second conveyor. According to a further example, the carrier is completely stopped. Since the carrier may be stopped, or moved slowly, at any location ahead of the container, the carrier may for example be controlled to stop or move slowly in connection with or at a RFID or bar code reader for enabling reliable position detection of the container when it is located close to or at the carrier. Alternatively, or in combination with the earlier example, the carrier may for example be controlled to stop or moved slowly at a location where the carrier is connected to an external power source for powering the transfer means. The carrier may thus for example be controlled to stop or moved slowly at a location where the carrier is connected to an external power source via at least two busbars arranged at the magnetic conveyor.

In a fourth step, the transfer means of the carrier is activated when the container is located side by side with the carrier, such that the product is transferred from the carrier to the container. This is performed while the carrier is controlled to stop or move slowly.

In a fifth step, the carrier is conveyed with a speed that is higher than the first speed of the second conveyor. The empty carrier can now be conveyed away from the container by the magnetic conveyor with a high speed, leaving space for other carriers to transfer products to other containers.

During all said steps above, the container is conveyed by the second conveyor with a constant first speed.

FIG. 7 shows a further example embodiment of a sorting system according to the disclosure, including also other structures, such as a product source location 31 and a product target location 32.

The method and system may for example function as follows: upon receiving an individual orders or instructions for distributing a set of products from the product source location 31, such as product storage station, to a product target location 32, such as a manifest or shipping location, one or more second product carriers are assigned to become loaded with products at a product transfer region 33, while circulating in the second conveyor 6.

In other words, each second product carrier 8 is assigned a specific load, and each second product carrier 8 is also provided with an individual tagging or identification means for enabling the control system to find a matching second product carrier 8. The tagging or identification means may for example be a wireless transmitter/receiver tag, such as an RFID tag, or a scannable visual code, such a 1D or 2D codes, QR code, or the like.

At the same time, first product carriers 7 are loaded with the requested products at a product source location 31, conveyed via the first synchronous conveyor 5 (illustrated with dash-dotted line in FIG. 7) to an entry location 34 of the first, asynchronous, conveyor 4.

At the entry location 34, the first product carrier 7 is shifted from being conveyed on an endless track or rollers to become conveyed with individually controllable speed for enabling a significantly improved and independent motion control of the first product carrier 7. The first, asynchronous, conveyor 4 may for example be linear magnetic conveyer that controls motion and speed of the first product carrier 7 by means of magnetic fields generated by stationary electromagnetic coils mounted in the linear magnetic conveyer.

Consequently, the control system may at this point independently and individually control speed of a first product carrier to move the first product carrier to a position next to a matching second product carrier located on the second conveyor.

The control system may then control the first product carrier 7 to transfer the product carried by the first product carrier to the second product carrier.

The actual transfer position generally depends on various factors, such as the position of the matching second product carrier 8 upon arrival of the first product carrier 7 to the entry location 34, and possible other first product carriers 7 temporarily blocking the path of said first product carrier, etc. Consequently, the system has a variable deposit location on the second conveyor.

This eliminates the need to have a many different stationary deposit locations, and thus enables a more compact design and smaller footprint.

After having transfer the product to a second product carrier 8, the first product carrier 7 is conveyed to an exit location 35 for dispatching the first product carriers from the asynchronous conveyor, and to convey the first product carrier back to the product source location 31 for picking up a new product, or waiting a buffer location 36.

In the schematic illustration of FIG. 7, only two individual products are illustrated, marked with a circle and a triangle for distinguishing from each other. The first product carriers 7 are illustrated carrying a single product, but the disclosure is not limited to this, and the first product carriers 7 may alternatively carry a plurality of products, depending in the circumstances.

The second product carriers 8 are illustrated carrying a plurality of products, but the disclosure is not limited to this, and the second product carriers 8 may alternatively carry a single product, depending in the circumstances.

The second product carriers 8 may be temporarily buffered in a buffer 37 while waiting for a sorting task, and first upon receiving a new individual order or instruction for distributing one or more products from the product source location to a product target location, one or more second product carriers located in the buffer may be assigned to carry out said individual order or instruction. In connection with this, the one or more second product carriers assigned to the task will leave the buffer 37 and enter the second conveyor via the infeed region 10.

In other words, the number of second product carriers 8 located on the second conveyor reflects the current need in a dynamic manner, such that the size of the second conveyor can be significantly reduced compared with conventional solutions that have stationary second product carriers assigned to different zip-codes or the like.

The system further includes automatic and individual dispatch of the second product carriers from the circulating path that has received the predetermined product load. In connection with receiving all products assigned to a specific second product carrier 8, the specific second product carriers will exit the second conveyor via an outfeed region 11, and be conveyed to a product target location 32 via a further conveyer 38, such as an endless chain conveyer or other type of synchronous conveyor (illustrated with dashed line in FIG. 7). In other words, the second conveyor is kept as empty as possible for the purpose of enabling a compact overall design.

The asynchronous conveyor and the carriers traveling on the asynchronous conveyor are independently controllable by a control system including, for example, programmable logic control (PLC) units and related graphic user interfaces (GUI), also possibly inclusive of regulating, monitoring and/or automated control systems, all of which are configured to operate in accordance with algorithms and procedures such as warehouse control system (WCS) software and similar. The control system may also be configured to control one or more of the second conveyer, the first synchronous conveyer, the buffer of the first and/or second product carriers, feeding of products on the first product carriers at the product source location, and unloading of products from the second product carriers at the product target location. The control system may also include software modules handling customer orders provided to the sorting system.

The system and method according to the disclosure is not to be regarded as being limited to the embodiments described above, a number of additional variants and modifications being possible within the scope of the subsequent patent claims. The conveyor system may comprise any number of carriers, and the container may have any size or shape.

The invention claimed is:

1. A sorting system comprising:

a first, asynchronous, conveyor having an entry location for receiving first product carriers and an exit location for dispatching the first product carriers from the asynchronous conveyor;

a second conveyor having a circulating path located at least in part next to the asynchronous conveyor and arranged for conveying second product carriers, an infeed region arranged for supplying second product carriers to the circulating path, and an outfeed region arranged to dispatch the second product carriers from the circulating path, wherein each second product carrier comprises an individual tagging or identification means; and a control system configured to control the asynchronous conveyor to:

independently and individually control speed of a first product carrier to move the first product carrier to a position next to a matching second product carrier located on the second conveyor, and transfer a product carried by the first product carrier to the second product carrier at a variable deposit location on the second conveyor while the second product carrier is moving.

2. The sorting system according to claim 1, further comprising a position monitoring arrangement configured for monitoring the position of the second product carriers located on the second conveyor based on detection of the individual tagging or identification means of the second product carriers.

3. The sorting system according to claim 1, wherein each second product carrier is assigned to receive an individual predetermined product load from the first product carriers, and wherein the control system is configured to determine a matching second product carrier based on said individual predetermined product load.

4. The sorting system according to claim 1, wherein the control system is configured to determine a position of a matching second product carrier based on the product load carried by the first product carrier.

5. The sorting system according to claim 1, wherein the sorting system further comprises a first, synchronous, conveyor arranged to supply first product carriers carrying products from a product source location to the entry location of the asynchronous conveyor, and to return unloaded first product carriers from the exit location of the asynchronous conveyor to the product source location, wherein the first, asynchronous, conveyor and the first synchronous, conveyor jointly define a first product path.

6. The sorting system according to claim 1, wherein the second conveyor is a synchronous conveyor or an asynchronous conveyor.

7. The sorting system according to claim 1, wherein the control system is arranged to automatically dispatch an individual second product carrier from the circulating path of the second conveyor when said individual second product carrier has received a predetermined product load assigned for said individual second product carrier.

8. The sorting system according to claim 1, wherein the sorting system is configured to receive individual orders or instructions for distributing products from the product source location to a product target location, and wherein the sorting system is arranged to assign the one or more products of said individual orders or instructions to one or more second product carriers.

9. The sorting system according to claim 8, wherein the sorting system comprises a buffer for temporarily buffering a plurality of second product carriers while waiting for a new sorting task, wherein the sorting system is configured to, upon receiving a new individual order or instruction for distributing one or more products from the product source location to a product target location, assign one or more second product carriers located in the buffer to carry out said individual order or instruction.

10. The sorting system according to claim 8, wherein the one or more second product carriers that are assigned to carry out said individual order or instruction, are conveyed from a temporary buffer location to the infeed region and further to the circulating path, and wherein each of said one or more second product carriers after having received a predetermined product load, is dispatched from the circulating path and conveyed to the product target location for delivery of the product load.

11. A method for sorting and distributing products from a product source location to a target location, the method comprising:

conveying the products on first product carriers from the product source location to an entry location of a first, asynchronous, conveyor, wherein the asynchronous conveyor also has an exit location for dispatching the first product carriers from the asynchronous conveyor;

conveying second product carriers on a second conveyor having a circulating path located at least in part next to the asynchronous conveyor, wherein the second conveyor has an infeed region arranged for supplying the second product carriers to the circulating path and an outfeed region arranged to dispatch the second product carriers from the circulating path, wherein each second product carrier comprises an individual tagging or identification means;

monitoring the position of the second product carriers located on the second conveyor based on detection of the individual tagging or identification means of the second product carriers;

independently and individually controlling speed of a first product carrier to move the first product carrier to a position next to a matching second product carrier located on the second conveyor, and transferring the product carried by the first product carrier to the second product carrier at a variable deposit location on the second conveyor while the second product carrier is moving.

12. The method according to claim 11, comprising assigning each second product carrier to receive an individual predetermined product load from the first product carriers, and determining a matching second product carrier based on said predetermined product load.

13. The method according to claim 11, further comprising supplying first product carriers carrying products from a product source location to the entry location of the asynchronous conveyor by means of a first, synchronous, conveyor, and returning unloaded first product carriers from the exit location of the asynchronous conveyor to the product source location by means of a first, synchronous, conveyor, wherein the first, asynchronous, conveyor and the first synchronous, conveyor jointly define a first product path.

14. The method according to claim 11, further comprising automatic dispatching an individual second product carrier from the circulating path of the second conveyor when said individual second product carrier has received a predetermined product load assigned for said individual second product carrier.

15. The method according to claim 11, further comprising:

conveying a second product carrier by the second conveyor with a constant first speed, conveying a first product carrier by a linear magnetic conveyor with a speed that is higher than the first speed until the first product carrier is positioned at the side of the second product carrier, conveying the first product carrier with the same speed as the second product carrier, activating a transfer means of the first product carrier such that the product is transferred from the first product carrier to the second product carrier, conveying the first product carrier with a speed that is higher than the first speed.

16. The method according to claim 11, further comprising receiving individual orders or instructions for distributing products from the product source location to a product target location, and assigning each product of said individual orders or instructions to second product carriers.

17. The method according to claim 16, further comprising temporarily buffering a plurality of second product carriers in a buffer while waiting for a new sorting task, and upon receiving a new individual order or instruction for distributing one or more products from the product source location to a product target location, assigning one or more second product carriers located in the buffer to carry out said individual order or instruction.

18. The method according to claim 16, further comprising conveying the one or more second product carriers that are assigned to carry out said individual order or instruction from the buffer to the infeed region and further to the circulating path, and individually dispatching said one or more second product carriers from the circulating path after having received a predetermined product load, and conveying said one or more second product carriers to the product target location for delivery of the product load.

* * * * *